US012719962B2

(12) United States Patent
Zhang et al.

(10) Patent No.: US 12,719,962 B2
(45) Date of Patent: Aug. 25, 2026

(54) SCREEN MIRRORING DEVICE DISCOVERY METHOD AND APPARATUS, ELECTRONIC DEVICE, AND STORAGE MEDIUM

(71) Applicant: Beijing Bytedance Network Technology Co., Ltd., Beijing (CN)

(72) Inventors: Jieting Zhang, Beijing (CN); Xianchao Shen, Beijing (CN); Zhenhua Yu, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 321 days.

(21) Appl. No.: 18/571,668

(22) PCT Filed: May 30, 2022

(86) PCT No.: PCT/CN2022/096010
§ 371 (c)(1),
(2) Date: Dec. 18, 2023

(87) PCT Pub. No.: WO2023/279891
PCT Pub. Date: Jan. 12, 2023

(65) Prior Publication Data

US 2024/0291898 A1 Aug. 29, 2024

(30) Foreign Application Priority Data

Jul. 7, 2021 (CN) ......................... 202110767354.9

(51) Int. Cl.
*H04L 67/52* (2022.01)

(52) U.S. Cl.
CPC .................................... *H04L 67/52* (2022.05)

(58) Field of Classification Search
CPC ....... H04L 67/52; H04L 67/63; H04L 67/141; H04L 61/5007; G06F 3/1454; H04W 48/16; H04W 76/10
See application file for complete search history.

(56) References Cited

U.S. PATENT DOCUMENTS

2003/0236889 A1* 12/2003 Manion .................... H04L 67/08 709/227
2015/0365453 A1* 12/2015 Cheng ................ H04N 21/2747 709/219
2017/0142198 A1 5/2017 Alhandy

FOREIGN PATENT DOCUMENTS

CN 105847421 A 8/2016
CN 106685776 A 5/2017
(Continued)

OTHER PUBLICATIONS

China National Intellectual Property Administration, Office Action and Search Report Issued in Application No. 202110767354.9, Jul. 25, 2022, 16 pages.

(Continued)

*Primary Examiner* — Siu M Lee
(74) *Attorney, Agent, or Firm* — Alleman Hall LLP

(57) ABSTRACT

A screen mirroring device discovery method is applied to a terminal device, and comprises: receiving an device discovery instruction; in response to the device discovery instruction, generating an device discovery request carrying device information of the terminal device, and sending the device discovery request to a server, wherein the device discovery request is used for requesting the server to determine, on the basis of the device information of the terminal device, all candidate screen mirroring devices located in the same local area network as the terminal device, and the device information comprises at least one of position information and network information; receiving local area network communication address information of each candidate screen mirroring device returned by the server; and determining a target screen mirroring device from among all the candidate screen mirroring devices according to the local area network communication address information of each candidate screen mirroring device.

20 Claims, 4 Drawing Sheets

(56) References Cited

FOREIGN PATENT DOCUMENTS

| | | | |
|---|---|---|---|
| CN | 108093390 | A | 5/2018 |
| CN | 109194754 | A | 1/2019 |
| CN | 111405042 | A | 7/2020 |
| CN | 111629371 | A | 9/2020 |
| CN | 111683275 | A | 9/2020 |
| CN | 112073771 | A | 12/2020 |
| CN | 112383500 | A | 2/2021 |
| CN | 112565461 | A | 3/2021 |
| CN | 113055976 | A | 6/2021 |
| CN | 113507517 | A | 10/2021 |

OTHER PUBLICATIONS

China National Intellectual Property Administration, Office Action Issued in Application No. 202110767354.9, Feb. 20, 2023, 15 pages.

ISA China National Intellectual Property Administration, International Search Report Issued in Application No. PCT/CN2022/096010, Aug. 15, 2022, WIPO, 15 pages.

* cited by examiner

SCREEN MIRRORING DEVICE DISCOVERY METHOD AND APPARATUS, ELECTRONIC DEVICE, AND STORAGE MEDIUM

This application is a U.S. National Stage under 35 U.S.C. § 371 of International Application No. PCT/CN2022/096010, as filed on May 30, 2022, which is based on and claims priority from the Chinese patent application No. 202110767354.9, filed with the China Patent Office on Jul. 7, 2021, the entire contents of each of these applications are incorporated herein by reference.

TECHNICAL FIELD

The embodiments of the present disclosure relate to the field of computer technology, and for example, to a screen projecting device discovery method and apparatus, an electronic device, and a storage medium.

BACKGROUND ART

In the related art, when screen projecting is performed over a local area network, screen projecting devices are generally searched for through the local area network and screen projecting is performed on the searched screen projecting devices.

However, due to the influence of factors such as hardware compatibility, when searching for screen projecting devices using the search method in the related prior art, a search failure occurs, resulting in a low discovery rate of the screen projecting device.

SUMMARY OF THE INVENTION

The embodiments of the present disclosure provide a screen projecting device discovery method and apparatus, an electronic device, and a storage medium, so as to improve the discovery rate of the screen projecting device.

The embodiments of the present disclosure provide a screen projecting device discovery method, which is applied to a terminal device, the method comprising:

receiving a device discovery instruction;

generating, in response to the device discovery instruction, a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including position information and/or network information;

receiving local area network communication address information of each candidate screen projecting device returned by the server; and determining a target screen projecting device from among all the candidate screen projecting devices according to the local area network communication address information of each candidate screen projecting device.

The embodiments of the present disclosure further provide another screen projecting device discovery method, which is applied to a server, the method comprising:

receiving a device discovery request sent from a terminal device, which carries device information of the terminal device, the device information including position information and/or network information;

determining all candidate screen projecting devices that are located in the same local area network as the terminal device according to the device information of the terminal device; and sending local area network communication address information of each candidate screen projecting device to the terminal device, so that the terminal device determines a target screen projecting device from among all the candidate screen projecting devices according to the local area network communication address information of each candidate screen projecting device.

The embodiments of the present disclosure further provide a screen projecting device discovery apparatus, which is applied to a terminal device, the apparatus comprising:

an instruction receiving module configured to receive a device discovery instruction;

a first response module configured to generate, in response to the device discovery instruction, a device discovery request carrying device information of the terminal device, and send the device discovery request to a server, wherein the device discovery request is used to request the server to determine, based on the device information of the terminal device, all candidate screen projecting devices that are located in the same local area network as the terminal device, the device information including position information and/or network information;

an information receiving module configured to receive local area network communication address information of each candidate screen projecting device returned by the server; and a target device determining module configured to determine a target screen projecting device from among all the candidate screen projecting devices according to the local area network communication address information of each candidate screen projecting device.

The embodiments of the present disclosure further provide another screen projecting device discovery apparatus, which is applied to a server, the apparatus comprising:

a request receiving module configured to receive a device discovery request sent by a terminal device, which carries device information of the terminal device, the device information including position information and/or network information;

a candidate device determining module configured to determine all candidate screen projecting devices that are located in the same local area network as the terminal device based on the device information of the terminal device; and an information sending module configured to send local area network communication address information of each candidate screen projecting device to the terminal device, so that the terminal device determines a target screen projecting device from among all the candidate screen projecting devices according to the local area network communication address information of each candidate screen projecting device.

The embodiments of the present disclosure further provide an electronic device, comprising:

one or more processors;

a memory configured to store one or more programs, wherein when the one or more programs are executed by the one or more processors, the one or more processors implement the screen projecting device discovery method according to the embodiments of the present disclosure.

The embodiments of the present disclosure further provide a computer-readable storage medium on which a computer program is stored, wherein the program, when executed by a processor, implements the screen projecting device discovery method according to the embodiments of the present disclosure.

BRIEF DESCRIPTION OF THE DRAWINGS

Reference is made to the following detailed description when taken in conjunction with the accompanying drawings. Throughout the drawings, the same or similar reference numbers refer to the same or similar elements. It should be understood that the drawings are schematic and that elements and components are not necessarily drawn to scale.

DETAILED DESCRIPTION

The embodiments of the present disclosure will be described below with reference to the accompanying drawings. While certain embodiments of the present disclosure have been illustrated in the accompanying drawings, it will be understood that the present disclosure may be implemented in a plurality of forms and should not be construed as limited to the embodiments set forth herein. It should be understood that the drawings and the embodiments of the present disclosure are for illustration purposes only and are not intended to limit the scope of the present disclosure.

It should be understood that a plurality of steps recited in method embodiments of the present disclosure may be performed in different orders, and/or performed in parallel. Moreover, the method embodiments may include additional steps and/or omit performing the illustrated steps. The scope of the present disclosure is not limited in this respect.

The term "including" and variations thereof as used herein is intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different apparatuses, modules or units, and are not used for limiting the order or interdependence of the functions performed by the apparatuses, modules or units.

It should be noted that references to "a" or "an" or "a plurality of" in the present disclosure are intended to be illustrative rather than limiting, and that those skilled in the art will appreciate that references to "one or more" are intended to be exemplary and not limiting unless the context clearly indicates otherwise.

The names of messages or information exchanged between apparatuses in the embodiments of the present disclosure are for illustrative purposes only, and are not intended to limit the scope of the messages or information.

Figure 1:
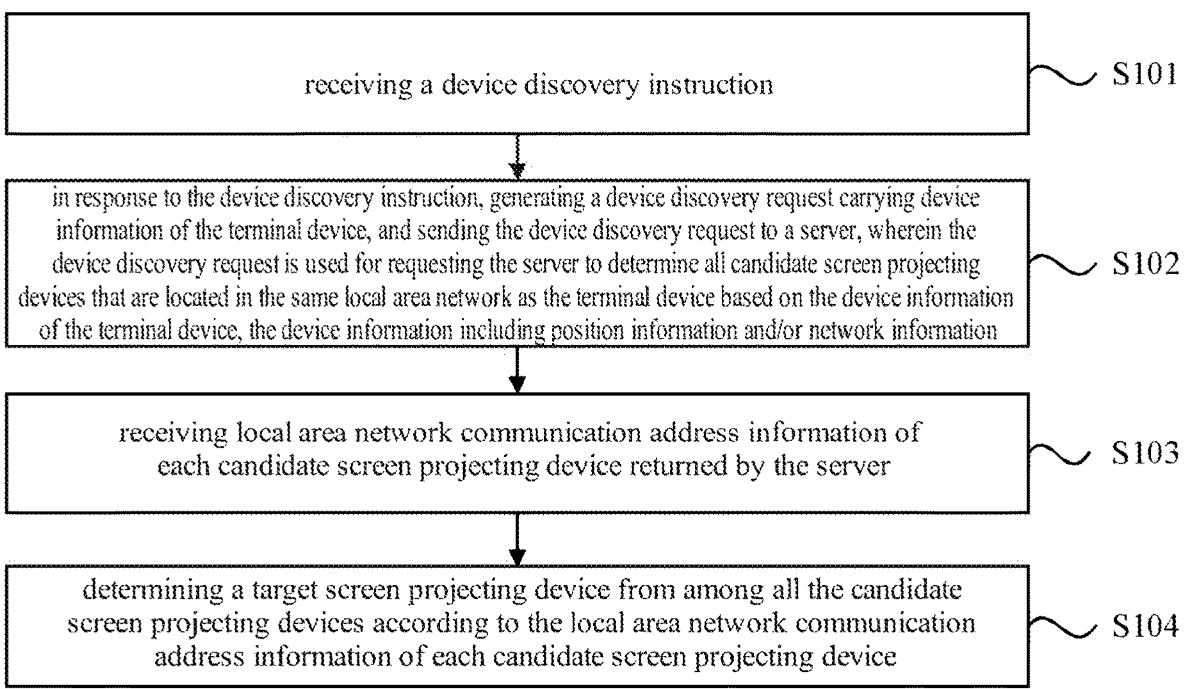
FIG. 1 is a schematic flowchart of a screen projecting device discovery method provided by the embodiments of the present disclosure.

FIG. 1 is a schematic flowchart of a screen projecting device discovery method provided by the embodiments of the present disclosure. This method may be executed by a screen projecting device discovery apparatus, wherein the apparatus may be implemented by software and/or hardware, and may be configured in an electronic device (terminal device), such as a mobile phone or a tablet computer. The screen projecting device discovery method provided by the embodiments of the present disclosure is applicable to scenarios in which screen projecting devices are discovered. As shown in FIG. 1, the screen projecting device discovery method provided by the embodiment may comprise the following steps:

S101, receiving a device discovery instruction.

The device discovery instruction may be an instruction for discovering screen projecting devices, and it may be sent by another device or generated based on a trigger operation of a user, for example, the device discovery instruction may be generated when a trigger operation (e.g., an operation of clicking a screen projecting control) for discovering screen projecting devices is received. The screen projecting device can be understood as a device for screen projecting, such as a television or a smart tablet.

Illustratively, when a user uses a terminal device to perform screen projecting, a trigger operation for discovering screen projecting devices may be performed or a device discovery instruction may be sent to the terminal device through another device. When detecting the trigger operation for discovering screen projecting devices performed by the user, the terminal device may determine that the device discovery instruction is received, or the terminal device may receive the device discovery instruction sent by another device.

S102, in response to the device discovery instruction, generating a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including position information and/or network information.

The device discovery request can be used for requesting the server to preliminarily determine screen projecting devices that are located in the same local area network as the terminal device. The candidate screen projecting devices may be screen projecting devices that are preliminarily determined by the server and located in the same local area network as the terminal device which sends the device discovery request. The device information may include position information and/or network information, wherein the position information may be geographical position information, such as longitude and latitude information of a geographical location where the terminal device is located; the network information may be related information of the terminal device within the network where the terminal device is located, such as an Internet Protocol (IP) address, a port number, and/or a subnet mask.

In this embodiment, the terminal device may preliminarily screen, through the server, candidate screen projecting devices that are in the same local area network as itself (that is, the terminal device) and further determine, according to the candidate screen projecting devices screened by the server, a target screen projecting device that is located in the same local area network as the terminal device itself, so that even if the terminal device or a router to which the terminal device is connected does not support the terminal device to search for screen projecting devices through the Wireless Fidelity (WiFi) technology, the screen projecting devices that are located in the same local area network as the terminal device can be determined, thereby reducing requirements on performance of the terminal device and the router, and improving the discovery rate of the screen projecting devices.

After receiving the device discovery instruction, the terminal device may obtain its own device information, generate a device discovery request carrying the device information, and send the device discovery request to the server. After receiving the device discovery request sent by the terminal device, the server may parse the device discovery request, obtain the device information carried in the device discovery request, and preliminarily determine, according to the device information, candidate screen projecting devices that are located in the same local area network as the terminal device. For example, the server may determine, as the candidate screen projecting devices, screen projecting devices that are located in a preset distance range from the terminal device, or determine, as the candidate screen projecting devices, screen projecting devices in which a field identifying the local area network in the network information is the same as or similar to a corresponding field in the network information of the terminal device; alternatively, the server may determine, as the candidate screen projecting devices, screen projecting devices that are located in a preset distance range from the terminal device and in which a field identifying the local area network in the network information is the same as or similar to a corresponding field in the network information of the terminal device, and so on.

S103, receiving local area network communication address information of each candidate screen projecting device returned by the server.

The local area network communication address information of one candidate screen projecting device may be communication address information of the candidate screen projecting device within the local area network where the candidate screen projecting device is located, such as an IP address and a port number of the candidate screen projecting device during communication in the local area network where the candidate screen projecting device is located. The local area network communication address information of each screen projecting device can be reported to the server by each screen projecting device, namely, after establishing connection with the server through the local area network, each screen projecting device can report communication address information of each screen projecting device within the local area network to the server for storage.

After preliminarily determining the candidate screen projecting devices that are located in the same local area network as the terminal device according to the device information of the terminal device that sends the device discovery request, the server may send the local area network communication address information of each candidate screen projecting device to the terminal device. The terminal device can receive the local area network communication address information of each candidate screen projecting device sent by the server.

S104, determining a target screen projecting device from among all the candidate screen projecting devices according to the local area network communication address information of each candidate screen projecting device.

The target screen projecting device may be understood as a screen projecting device that is located in the same local area network as the terminal device and is used for the terminal device to perform screen projecting (for example, in an online state).

In this embodiment, after receiving the local area network communication address information of each candidate screen projecting device sent by the server, the terminal device may further determine, according to the local area network communication address information of each candidate screen projecting device, whether each candidate screen projecting device is located in the same local area network as the terminal device itself, and determine, as the discovered target screen projecting device, the candidate screen projecting device that is determined to be located in the same local area network as the terminal device itself.

Here, the method for determining the target screen projecting device among the candidate screen projecting devices may be set as needed. For example, the terminal device may communicate with each candidate screen projecting device according to the local area network communication address information of the candidate screen projecting device, for example, the terminal device may send detection information to the candidate screen projecting device; if communication is successful, for example, the terminal device receives response information returned by the candidate screen projecting device for the detection information, it is determined that the candidate screen projecting device and the terminal device itself are located in the same local area network, and the candidate screen projecting device is determined as the target screen projecting device; otherwise, if the terminal device fails to receive the response information returned by the candidate screen projecting device for the detection information, it is determined that the candidate screen projecting device is not the target screen projecting device.

In this embodiment, when the device discovery instruction is received, the screen projecting devices can be discovered only using one discovery method (for example, the screen projecting devices are discovered through the server); the screen projecting devices can also be discovered in various ways to further improve the discovery rate of the screen projecting devices. Optionally, the screen projecting device discovery method provided by this embodiment may further comprise: in response to the device discovery instruction, performing screen projecting device discovery based on at least one of a WiFi protocol, a Bluetooth protocol and a near-field communication protocol, and determining all the discovered screen projecting devices as target screen projecting devices.

The WiFi protocol may be understood as a WiFi communication protocol, which may include a Multicast Domain Name System (mDNS) protocol, a Domain Name System-Service Discovery (DNS-SD) protocol, and/or a Universal Plug and Play (Upnp) protocol.

Illustratively, after receiving the device discovery instruction, the terminal device may execute at least two screen projecting device discovery modes among screen projecting device discovery through the server (i.e., S102-104), screen projecting device search based on the mDNS protocol and the DNS-SD protocol, screen projecting device search based on the Upnp protocol, screen projecting device search based on the Bluetooth protocol, and screen projecting device identification based on Near-field Communication (NFC), determine all the screen projecting devices discovered after executing the at least two discovery modes as target screen projecting devices, and may further display device description information of the discovered target screen projecting devices to the user.

For example, after receiving the device discovery instruction, the terminal device may execute S102-S104, and simultaneously search for screen projecting devices through WiFi based on the mDNS protocol and the DNS-SD protocol, and/or the Upnp protocol, turn on Bluetooth and search for screen projecting devices based on the Bluetooth protocol, and identify nearby screen projecting devices through the NFC protocol based on the NFC turned on, and determine the candidate screen projecting devices determined according to the local area network communication address information, the screen projecting devices searched through WiFi, the screen projecting devices searched through Bluetooth, and the screen projecting devices identified through NFC all as target screen projecting devices. Here, it is required to assume that the terminal device supports Bluetooth communication/NFC communication in order to perform screen projecting device discovery based on the Bluetooth protocol/NFC protocol, and when the terminal device supports Bluetooth communication/NFC communication, after receiving the device discovery instruction, the terminal device can turn on the Bluetooth function/NFC function automatically or based on a user's turn-on operation, and discover screen projecting devices based on the Bluetooth protocol/NFC protocol.

The screen projecting device discovery method provided by this embodiment comprises receiving a device discovery instruction; in response to the device discovery instruction, generating a device discovery request carrying position information and/or network information of the terminal device, and sending the device discovery request to a server so as to request the server to determine all candidate screen projecting devices that are located in the same local area network as the terminal device based on the position information and/or the network information; receiving local area network communication address information of each candidate screen projecting device returned by the server; and determining a target screen projecting device among the candidate screen projecting devices according to the local area network communication address information of each candidate screen projecting device. By adopting the technical solution of this embodiment described above, in which the candidate screen projecting devices are preliminarily determined by the server according to the position information and/or the network information of the terminal device, and the target screen projecting devices from among the candidate screen projecting devices are accurately determined by the terminal device according to the local area network communication address information of each candidate screen projecting device, the requirement of the screen projecting device discovery process on hardware compatibility can be reduced, and the discovery rate of the screen projecting devices can be improved.

Figures 2, 3:
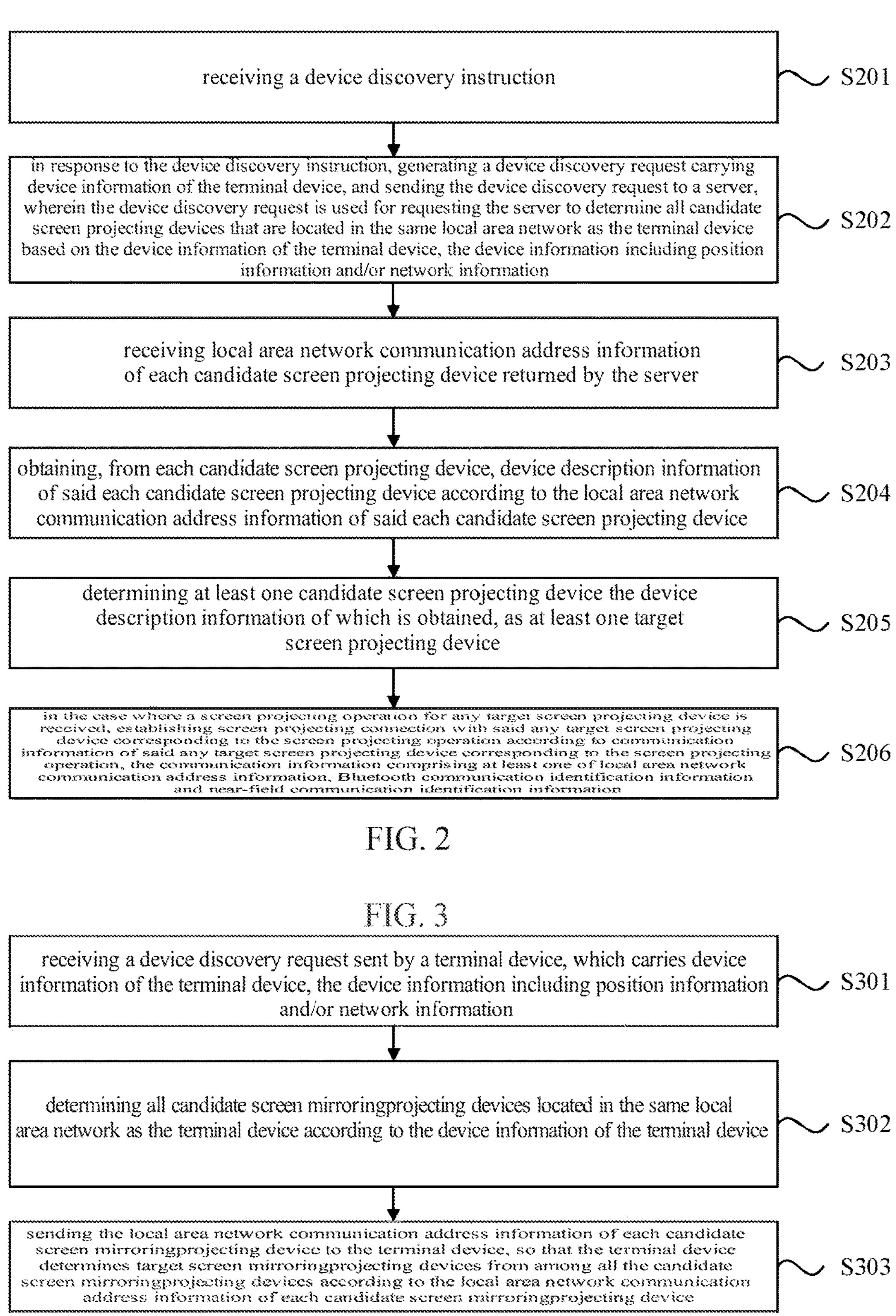
FIG. 2 is a schematic flowchart of another screen projecting device discovery method provided by the embodiments of the present disclosure.
FIG. 3 is a schematic flowchart of another screen projecting device discovery method provided by the embodiments of the present disclosure.

FIG. 2 is a schematic flowchart of another screen projecting device discovery method provided by the embodiments of the present disclosure. The solution in this embodiment can be combined with one or more of the alternatives in the embodiments described above. Optionally, the determining a target screen projecting device from among all the candidate screen projecting devices according to the local area network communication address information of each candidate screen projecting device comprises: obtaining device description information of each candidate screen projecting device from said each candidate screen projecting device according to the local area network communication address information of said each candidate screen projecting device; and determining at least one candidate screen projecting device, the device description information of which is obtained, as at least one target screen projecting device.

Optionally, the screen projecting device discovery method provided by this embodiment may further comprise: upon receiving a screen projecting operation with respect to any target screen projecting device, establishing a screen projecting connection with any target screen projecting device corresponding to the screen projecting operation according to communication information of said any target screen projecting device corresponding to the screen projecting operation, wherein the communication information includes at least one of local area network communication address information, Bluetooth communication identification information and near-field communication identification information.

As shown in FIG. 2, the screen projecting device discovery method provided by this embodiment comprises the following steps:

S201, receiving a device discovery instruction.

S202, in response to the device discovery instruction, generating a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including position information and/or network information.

S203, receiving local area network communication address information of each candidate screen projecting device returned by the server.

S204, obtaining, from each candidate screen projecting device, device description information of said each candidate screen projecting device according to the local area network communication address information of said each candidate screen projecting device.

S205, determining at least one candidate screen projecting device the device description information of which is obtained, as at least one target screen projecting device.

The device description information of one screen projecting device may be understood as description information of the screen projecting device, which may include a device name of the screen projecting device, and may further include factory information and/or service information of the screen projecting device, etc.

In this embodiment, the terminal device may perform local area network communication with each candidate screen projecting device by obtaining device description information of a corresponding candidate screen projecting device from said each candidate screen projecting device according to a local area network communication address of said each candidate screen projecting device, so as to verify whether each candidate screen projecting device is located in the same local area network as the device (i.e., the terminal device).

The terminal device may obtain, for each candidate screen projecting device, device description information of the candidate screen projecting device from the candidate screen projecting device according to a local area network communication address of the candidate screen projecting device sent by the server, and if the obtaining is successful, that is, if the device description information of the candidate screen projecting device is successfully obtained, it is indicated that the local area network communication address of the candidate screen projecting device is a local area network communication address in a local area network where the terminal device is located, and at this time, it may be determined that the candidate screen projecting device and the terminal device are located in the same local area network, and the candidate screen projecting device is determined as the discovered target screen projecting device; if the obtaining fails, that is, if the device description information of the candidate screen projecting device is not obtained, it is indicated that the local area network communication address of the candidate screen projecting device is an invalid communication address in the local area network where the terminal device is located or that the candidate screen projecting device is in an offline state, and it is also indicated that the candidate screen projecting device is not available for the terminal device to perform screen projecting at the current time, and at this time, the candidate screen projecting device cannot be determined as a target screen projecting device.

In this embodiment, the terminal device may obtain device description information of each candidate screen projecting device by sending a description information obtaining request to each candidate screen projecting device. Optionally, the obtaining, from each candidate screen projecting device, device description information of said each candidate screen projecting device according to the local area network communication address information of said each candidate screen projecting device comprises: sending, for each candidate screen projecting device, a description information obtaining request to the candidate screen projecting device according to the local area network communication address information of the candidate screen projecting device, and receiving device description information of the candidate screen projecting device returned by the candidate screen projecting device based on the description information obtaining request.

Illustratively, the terminal device generates a description information obtaining request for each candidate screen projecting device and sends the description information obtaining request to the candidate screen projecting device according to the received local area network communication address information of the candidate screen projecting device; when receiving the description information obtaining request sent by the terminal device, the candidate screen projecting device may send, in response to the description information obtaining request, the device description information of the candidate screen projecting device itself to the terminal device; therefore, the terminal device may receive the device description information of the candidate screen projecting device itself sent by the candidate screen projecting device.

S206, in the case where a screen projecting operation for any target screen projecting device is received, establishing screen projecting connection with said any target screen projecting device corresponding to the screen projecting operation according to communication information of said any target screen projecting device corresponding to the screen projecting operation, wherein the communication information comprises at least one of local area network communication address information, Bluetooth communication identification information and near-field communication identification information.

The Bluetooth communication identification information of one target screen projecting device may be identification information of the target screen projecting device at the time of establishing Bluetooth communication connection (including screen projecting connection), that is, the terminal device may establish Bluetooth protocol based screen projecting connection with the target screen projecting device based on the Bluetooth communication identification information of the target screen projecting device. The near-field communication identification information of one target screen projecting device may be identification information of the target screen projecting device at the time of establishing NFC connection (including screen projecting connection), that is, the terminal device may establish NFC protocol based screen projecting connection with the target screen projecting device based on the near-field communication identification information of the target screen projecting device.

Illustratively, after determining the target screen projecting devices available for screen projecting, the terminal device may display device description information of each target screen projecting device, such as a device name of each target screen projecting device. Therefore, when a user intends to perform screen projecting to one target screen projecting device, the user can trigger (e.g., click) the device description information of the target screen projecting device to which the user intends to perform screen projecting. When it is detected that the user triggers device description information of one target screen projecting device, the electronic device (terminal device) may establish screen projecting connection with the target screen projecting device corresponding to the device description information triggered by the user based on a screen projecting connection establishment rule set in advance, and send screen projecting data to the target device through the screen projecting connection to perform screen projecting.

In this embodiment, the screen projecting connection establishment rule may be set as needed, for example, a screen projecting connection may be established with a target screen projecting device selected by a user based on one or more protocols. At the time of establishing a screen projecting connection with a target screen projecting device selected by a user based on only one protocol, it is possible to establish, based on the priorities of multiple protocols (such as mDNS protocol and DNS-SD protocol, Upnp protocol, Bluetooth protocol, and/or NFC protocol) set in advance, the screen projecting connection with the target screen projecting device based on the protocol with the higher priority and capable of establishing screen projecting connection with the target screen projecting device; at the time of establishing the screen projecting connection with the target screen projecting device selected by the user based on multiple protocols, it is possible to establish the screen projecting connection with the target screen projecting device based simultaneously on multiple protocols capable of establishing the screen projecting connection with the target screen projecting device among mDNS protocol and DNS-SD protocol, Upnp protocol, Bluetooth protocol and/or NFC protocol, thereby improving the screen projecting stability.

In one embodiment, after the establishing screen projecting connection with said any target screen projecting device corresponding to the screen projecting operation, the method further comprises: if the screen projecting connection comprises screen projecting connection established based on local area network communication address information, storing local area network communication address information of said any target screen projecting device corresponding to the screen projecting operation; the method further comprises: in response to the device discovery instruction, determining screen projecting devices corresponding to all the local area network communication address information stored in the terminal device as target screen projecting devices.

In the above embodiment, after the terminal device establishes a screen projecting connection with one screen projecting device based on local area network communication address information, e.g., after the terminal device establishes a screen projecting connection with one screen projecting device through WiFi, local area network communication address information of the screen projecting device may be stored, so that when a device discovery instruction is received, the screen projecting devices corresponding to the local area network communication address information stored in the terminal device may be directly determined as the discovered target screen projecting devices, and device discovery may be performed based on the server, WiFi, Bluetooth and/or NFC meanwhile, thereby increasing the determination speed of the target screen projecting devices, that is, increasing the discovery speed of the screen projecting devices.

When receiving a device discovery instruction, the terminal device may determine, as the discovered target screen projecting device, a screen projecting device corresponding to each piece of local area network communication address information stored in the terminal device, and send a device discovery request to the server, to determine, from among candidate screen projecting devices determined by the server, a target screen projecting device that is located in the same local area network as the terminal device, and store, after establishing a screen projecting connection with one target screen projecting device based on a local area network communication address, local area network communication address information of the target screen projecting device if the local area network communication address information of the target screen projecting device has not been stored in the terminal device. The local area network communication address information of each screen projecting device can be stored in a buffer or a memory of the terminal device; all local area network communication address information stored in the terminal device can be sequenced from back to front in the order of time of establishing the screen projecting connection, so that the screen projecting devices frequently used by the user are preferentially determined as target screen projecting devices.

In consideration of the situation that the screen projecting devices corresponding to the stored local area network communication address information are in an offline state, optionally, at the time of performing device discovery, the online situation of the screen projecting devices corresponding to all the local area network communication address information stored in the terminal device can be further determined, and only the screen projecting devices in an online state among the screen projecting devices corresponding to all the local area network communication address information stored in the terminal device are determined as target screen projecting devices. The determining, as target screen projecting devices, screen projecting devices corresponding to all the local area network communication address information stored in the terminal device may comprise: obtaining device description information of a screen projecting device corresponding to each piece of local area network communication address information according to said each piece of local area network communication address information stored in the terminal device; and determining at least one screen projecting device the device description information of which is obtained, as at least one target screen projecting device.

Illustratively, for each piece of local area network communication address information stored in the terminal device, device description information of a screen projecting device corresponding to local area network communication address information is obtained from the screen projecting device according to each local area network communication address, and if the obtaining is successful, that is, if the device description information of the screen projecting device is successfully obtained, the screen projecting device is determined as a target screen projecting device; if the obtaining fails, that is, if the device description information of the screen projecting device is not obtained, the screen projecting device is not determined as a target screen projecting device.

In addition, when the terminal device fails to establish a screen projecting connection with a target screen projecting device corresponding to a piece of local area network communication address information stored in the terminal device based on the local area network communication address information and/or when the terminal device fails to obtain device description information from a screen projecting device corresponding to a piece of local area network communication address information stored in the terminal device based on the local area network communication address information, and the number of continuous failures reaches a set number of times (which means at this time that the target screen projecting device is not on-line for a long time), the local area network communication address information stored in the terminal device can be deleted. The screen projecting device discovery method provided by this embodiment may further comprise: deleting, from the terminal device, local area network communication address information of the screen projecting device the device description information of which has not been obtained for a set number of times continuously.

The screen projecting device discovery method provided by this embodiment can discover screen projecting devices based on one or more modes and establish a screen projecting connection with the screen projecting devices, can reduce the requirement of the screen projecting device discovery process on hardware compatibility, improve the discovery rate of the screen projecting devices, and improve the stability in screen projecting.

FIG. 3 is a schematic flowchart of a screen projecting device discovery method provided by the embodiments of the present disclosure. This method may be performed by a screen projecting device discovery apparatus, and the apparatus may be implemented by software and/or hardware, may be configured in an electronic device, and may be configured in a server, for example. The screen projecting device discovery method provided by the embodiments of the present disclosure is suitable for a scenario of discovering screen projecting devices. As shown in FIG. 1, the screen projecting device discovery method provided by this embodiment may comprise the following steps:

S301, receiving a device discovery request sent by a terminal device, which carries device information of the terminal device, the device information including position information and/or network information.

In this embodiment, the server may receive the device discovery request sent by the terminal device, and parse the device discovery request to obtain device information of the terminal device carried in the device discovery request, so as to preliminarily determine, according to the device information, screen projecting devices that are located in the same local area network as the terminal device.

The device discovery request may be a request for requesting the server to preliminarily determine screen projecting devices that are located in the same local area network as the terminal device, and the device discovery request may be sent by the terminal device when there exists a need to discover screen projecting devices, for example, when a screen projecting discovery instruction is received. The device discovery request may carry device information of the terminal device. The device information of the terminal device may include position information and/or network information of the terminal device, wherein the position information may be geographical position information of the terminal device, such as longitude and latitude information of a geographical location where the terminal device is located; the network information may be related information of the terminal device in the network where the terminal device is located, such as an IP address, a port number, and/or a subnet mask.

S302, determining all candidate screen projecting devices located in the same local area network as the terminal device according to the device information of the terminal device.

The candidate screen projecting devices may be screen projecting devices in the same local area network as the terminal device, which are preliminarily determined based on the device information of the terminal device.

In this embodiment, the server may preliminarily determine the candidate screen projecting devices located in the same local area network as the terminal device according to the device information of the terminal device, so that the terminal device can determine the screen projecting devices in the same local area network as the terminal device without performing a screen projecting device search based on the WiFi protocol, thereby reducing requirements on performance of the terminal device and the router, and improving the discovery rate of screen projecting devices.

After obtaining the device information of the terminal device by parsing, the server may preliminarily determine the candidate screen projecting devices located in the same local area network as the terminal device according to the device information, for example, calculate a distance between each screen projecting device and the terminal device according to the position information of the terminal device and the position information of at least one screen projecting device stored in the server, and determine, as the candidate screen projecting devices, screen projecting devices that are located within a preset distance range from the terminal device, and/or determine, as the candidate screen projecting devices, screen projecting devices in which a field identifying the local area network in the network information is the same as or similar to a corresponding field in the network information of the terminal device, according to the network information of the terminal device and the network information of at least one screen projecting device stored in the server, and so on.

The server may obtain device information of each screen projecting device, for example, obtain the device information of each screen projecting device from each screen projecting device, or obtain the device information of each screen projecting device from the server, and the following description will be made by taking obtaining the device information of each screen projecting device from the server as an example. When the device information of each screen projecting device is obtained from the server, the server may store the device information of each screen projecting device in advance, for example, each screen projecting device may establish a long connection with the server, for example, establish a long connection with the server through WebSocket, and report its own device information to the server after initially establishing a long connection with the server, so that the server may receive and store the device information reported by each screen projecting device that establishes a long connection with the server. Optionally, before receiving the device discovery request sent by the terminal device, the method further comprises: receiving and storing device information of at least one screen projecting device, wherein the device information of each screen projecting device is reported by the screen projecting device.

In one embodiment, the device information includes position information and network information, and the determining, according to the device information of the terminal device, all candidate screen projecting devices located in the same local area network as the terminal device comprises: determining all close-range screen projecting devices located within a preset distance range from the terminal device according to the position information of the terminal device and the position information of at least one screen projecting device stored in the server; and determining all candidate screen projecting devices located in the same local area network as the terminal device among all the close-range screen projecting devices, according to the network information of the terminal device and the network information of each close-range screen projecting device stored in the server.

In the above embodiment, the candidate screen projecting devices may be determined according to both the position information and the network information of the terminal device, so as to further improve the accuracy of the determined candidate screen projecting devices.

After the server obtains the position information and the network information of the terminal device by parsing, first, the position information of at least one screen projecting device stored in the server may be obtained, a distance between each screen projecting device and the terminal device is calculated according to the position information of each screen projecting device and the position information of the terminal device, and the screen projecting devices having a distance from the terminal device within a preset distance range are determined, that is, the close-range screen projecting devices are determined; then, network information of each close-range screen projecting device stored in the server is obtained, and the close-range screen projecting devices in the same local area network as the terminal device are preliminarily determined according to the network information of each close-range screen projecting device and the network information of the terminal device, that is, the candidate screen projecting devices are determined. The preset distance range may be set as needed, for example, the preset distance range may be set to 20 m, 50 m, 100 m, or the like, which is not limited by this embodiment; the close-range screen projecting devices can be understood as screen projecting devices which are closer to the terminal device, namely screen projecting devices having a distance from the terminal device within the preset distance range.

In the above embodiment, after obtaining the position information and the network information of the terminal device by parsing, the candidate screen projecting devices can be determined directly according to the position information and the network information; it is also possible to first judge whether the network to which the terminal device is currently connected is a local area network, according to the network information, and the candidate screen projecting devices are determined according to the position information and the network information only when the network to which the terminal device is currently connected is the local area network, but when the network to which the terminal device is currently connected is a wide area network, it is directly determined that the candidate screen projecting devices located in the same local area network as the terminal device are not searched, and the operation of determining the candidate screen projecting devices according to the position information and the network information will not be performed, so as to improve the discovery speed of the screen projecting equipment. Optionally, before the determining all candidate screen projecting devices located in the same local area network as the terminal device according to the device information of the terminal device, the method further comprises: determining that the network to which the terminal device is currently connected is a local area network, according to the network information of the terminal device.

S303, sending the local area network communication address information of each candidate screen projecting device to the terminal device, so that the terminal device determines target screen projecting devices from among all the candidate screen projecting devices according to the local area network communication address information of each candidate screen projecting device.

The local area network communication address information of one candidate screen projecting device may be communication address information of the candidate screen projecting device in the local area network where the candidate screen projecting device is located, such as an IP address and a port number of the candidate screen projecting device when performing communication in the local area network where the candidate screen projecting device is located. Domain network communication address information of each screen projecting device can be reported by each screen projecting device, namely, after each screen projecting device is connected to a local area network, the communication address information of the screen projecting device in the local area network can be reported to the server for storage.

After preliminarily determining the candidate screen projecting devices located in the same local area network as the terminal device, the server may obtain local area network communication address information of each candidate screen projecting device stored in the server, and send the obtained local area network communication address information of each candidate screen projecting device to the terminal device, so that the terminal device further screens the candidate screen projecting devices according to the local area network communication address information of each candidate screen projecting device, and determines target screen projecting devices from among all the candidate screen projecting devices.

The screen projecting device discovery method provided by this embodiment comprises receiving a device discovery request sent by the terminal device, which carries position information and/or network information of the terminal device, determines candidate screen projecting devices located in the same local area network as the terminal device according to the position information and/or the network information, and sends local area network communication address information f the determined candidate screen projecting devices to the terminal device, so that the terminal device determines target screen projecting devices from among all the candidate screen projecting devices according to the local area network communication address information. By adopting the technical solution of this embodiment described above, in which the candidate screen projecting devices are preliminarily determined by the server according to the position information and/or the network information of the terminal device, and the target screen projecting devices from among the candidate screen projecting devices are accurately determined by the terminal device according to the local area network communication address information of each candidate screen projecting device, the requirement of the screen projecting device discovery process on hardware compatibility can be reduced, and the discovery rate of the screen projecting devices can be improved.

Figure 4:
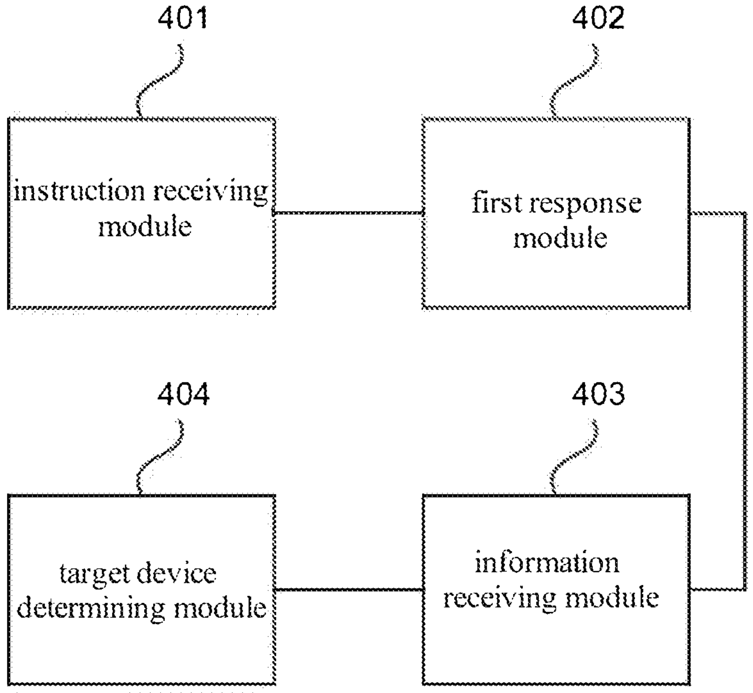
FIG. 4 is a structural block diagram of a screen projecting device discovery apparatus provided by the embodiments of the present disclosure.

FIG. 4 is a structural block diagram of a screen projecting device discovery apparatus provided by the embodiments of the present disclosure. The apparatus may be implemented by software and/or hardware, may be configured in an electronic device, may be configured, for example, in a mobile phone or a tablet computer, and may discover screen projecting devices by performing a screen projecting device discovery method. As shown in FIG. 4, the screen projecting device discovery apparatus provided by this embodiment may comprise: an instruction receiving module 401, a first response module 402, an information receiving module 403, and a target device determining module 404, wherein, the instruction receiving module 401 is configured to receive a device discovery instruction; the first response module 402 is configured to generate, in response to the device discovery instruction, a device discovery request carrying device information of a terminal device, and send the device discovery request to a server, wherein the device discovery request is used for requesting the server to determine all candidate screen projecting devices located in the same local area network as the terminal device based on the device information of the terminal device, the device information including position information and/or network information; the information receiving module 403 is configured to local receive area network communication address information of each candidate screen projecting device returned by the server; and the target device determining module 404 is configured to determine target screen projecting devices from among all the candidate screen projecting devices according to the local area network communication address information of each candidate screen projecting device.

The screen projecting device discovery apparatus provided by this embodiment receives a device discovery instruction through a instruction receiving module; generates through a first response module, in response to the device discovery instruction, a device discovery request carrying position information and/or network information of a terminal device, and sends the device discovery request to a server to request the server to determine all candidate screen projecting devices located in the same local area network as the terminal device based on the position information and/or the network information; receives, through an information receiving module, local area network communication address information of each candidate screen projecting device returned by the server; and determines, through a target device determining module, target screen projecting devices from among all the candidate screen projecting devices according to the local area network communication address information of each candidate screen projecting device. By adopting the technical solution of this embodiment described above, in which the candidate screen projecting devices are preliminarily determined by the server according to the position information and/or the network information of the terminal device, and the target screen projecting devices from among the candidate screen projecting devices are accurately determined by the terminal device according to the local area network communication address information of each candidate screen projecting device, the requirement of the screen projecting device discovery process on hardware compatibility can be reduced, and the discovery rate of the screen projecting devices can be improved.

In the solution described above, the target device determining module 404 may comprise: an information obtaining unit configured to obtain device description information of each candidate screen projecting device from said each candidate screen projecting device according to the local area network communication address information of said each candidate screen projecting device; and a target device determining unit configured to determine at least one candidate screen projecting device the device description information of which is obtained as at least one target screen projecting device.

In the solution described above, the information obtaining unit is configured to: send, for each candidate screen projecting device, a description information obtaining request to the candidate screen projecting device according to the local area network communication address information of the candidate screen projecting device, and receive device description information of the candidate screen projecting device returned by the candidate screen projecting device based on the description information obtaining request.

The screen projecting device discovery apparatus provided by this embodiment may further comprise: a second response module configured to perform screen projecting device discovery based on at least one of a WiFi protocol, a Bluetooth protocol and a near-field communication protocol in response to the device discovery instruction, and determine all the discovered screen projecting devices as target screen projecting devices.

The screen projecting device discovery apparatus provided by this embodiment may further comprise: a screen projecting connection module configured to establish, upon receiving a screen projecting operation for any target screen projecting device, a screen projecting connection with said any target screen projecting device corresponding to the screen projecting operation according to communication information of said any target screen projecting device corresponding to the screen projecting operation, wherein the communication information includes at least one of local area network communication address information, Bluetooth communication identification information and near-field communication identification information.

The screen projecting device discovery apparatus provided by this embodiment may further comprise: an address information storage module configured to store, after establishing the screen projecting connection with said any target screen projecting device corresponding to the screen projecting operation, the local area network communication address information of said any target screen projecting device corresponding to the screen projecting operation if the screen projecting connection comprises a screen projecting connection established based on the local area network communication address information; and a third response module configured to determine, in response to the device discovery instruction, screen projecting devices corresponding to all the local area network communication address information stored in the terminal device as target screen projecting devices.

In the solution described above, the third response module is configured to: obtain device description information of a screen projecting device corresponding to each piece of local area network communication address information according to said each piece of local area network communication address information stored in the terminal device; and determine at least one screen projecting device the device description information of which is obtained as at least one target screen projecting device.

The screen projecting device discovery apparatus provided by this embodiment may further comprise: an address information deleting module configured to delete, from the terminal device, the local area network communication address information of the screen projecting device, the device description information of which has not been obtained for a set number of times continuously.

The screen projecting device discovery apparatus provided by the embodiments of the present disclosure can execute the screen projecting device discovery method executed by the terminal device provided by the embodiments of the present disclosure, and possesses the corresponding functional modules that execute the screen projecting device discovery method. For details of the technology not described in detail in this embodiment, reference may be made to a screen projecting device discovery method provided by any embodiment of the present disclosure.

Figure 5:
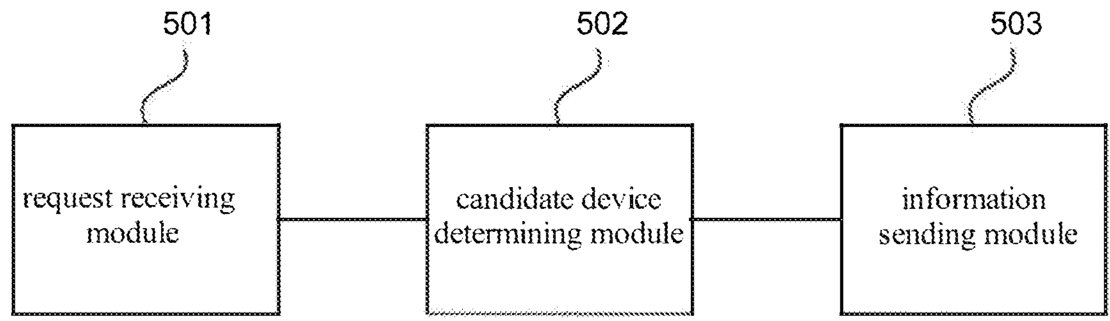
FIG. 5 is a structural block diagram of another screen projecting device discovery apparatus provided by the embodiments of the present disclosure.

FIG. 5 is a structural block diagram of a screen projecting device discovery apparatus provided by the embodiments of the present disclosure. The apparatus may be implemented by software and/or hardware, may be configured in an electronic device, and may be configured in a server, for example, and may discover screen projecting devices by performing a screen projecting device discovery method. As shown in FIG. 5, the screen projecting device discovery apparatus provided by this embodiment may comprise: a request receiving module 501, a candidate device determining module 502 and an information sending module 503, wherein the request receiving module 501 is configured to receive a device discovery request sent by a terminal device, which carries device information of the terminal device, the device information including position information and/or network information; the candidate device determining module 502 is configured to determine all candidate screen projecting devices located in the same local area network as the terminal device according to the device information of the terminal device; the information sending module 503 is configured to send local area network communication address information of each candidate screen projecting device to the terminal device, so that the terminal device determines target screen projecting devices from among all the candidate screen projecting devices to the local area network according communication address information of each candidate screen projecting device.

The screen projecting device discovery apparatus provided by this embodiment receives, through a request receiving module, a device discovery request sent by a terminal device, which carries position information and/or network information of the terminal device, determines, through a candidate device determining module, all candidate screen projecting devices located in the same local area network as the terminal device according to the position information and/or the network information, and sends, through an information sending module, local area network communication address information of each candidate screen projecting device to the terminal device, so that the terminal device determines target screen projecting devices from among all the candidate screen projecting devices according to the local area network communication address information of each candidate screen projecting device. By adopting the technical solution of this embodiment described above, in which the candidate screen projecting devices are preliminarily determined by the server according to the position information and/or the network information of the terminal device, and the target screen projecting devices from among the candidate screen projecting devices are accurately determined by the terminal device according to the local area network communication address information of each candidate screen projecting device, the requirement of the screen projecting device discovery process on hardware compatibility can be reduced, and the discovery rate of the screen projecting devices can be improved.

In the solution described above, the device information may include position information and network information, and the candidate device determining module 502 may comprise: a position determining unit configured to determine all close-range screen projecting devices located in a preset distance range with the terminal device according to the position information of the terminal device and the position information of at least one screen projecting device stored in the server; a network information determining unit configured to determine all candidate screen projecting devices located in the same local area network as the terminal device from among the close-range screen projecting devices according to the network information of the terminal device and the network information of each close-range screen projecting device stored in the server.

The screen projecting device discovery apparatus provided by this embodiment may further comprise: a network determining module configured to determine, according to the network information of the terminal device, that a network to which the terminal device is currently connected is a local area network, before determining, according to the device information of the terminal device, all candidate screen projecting devices located in the same local area network as the terminal device.

The screen projecting device discovery apparatus provided by this embodiment may further comprise: a device information storage module configured to receive and store device information of at least one screen projecting device before receiving the device discovery request sent by the terminal device, wherein the device information of each screen projecting device is reported by the screen projecting device.

The screen projecting device discovery apparatus provided by the embodiments of the present disclosure can execute the screen projecting device discovery method executed by the server provided by the embodiments of the present disclosure, and possesses the corresponding functional modules for executing the screen projecting device discovery method. For details of the technology not described in detail in this embodiment, reference may be made to a screen projecting device discovery method provided by any embodiment of the present disclosure.

Figure 6:
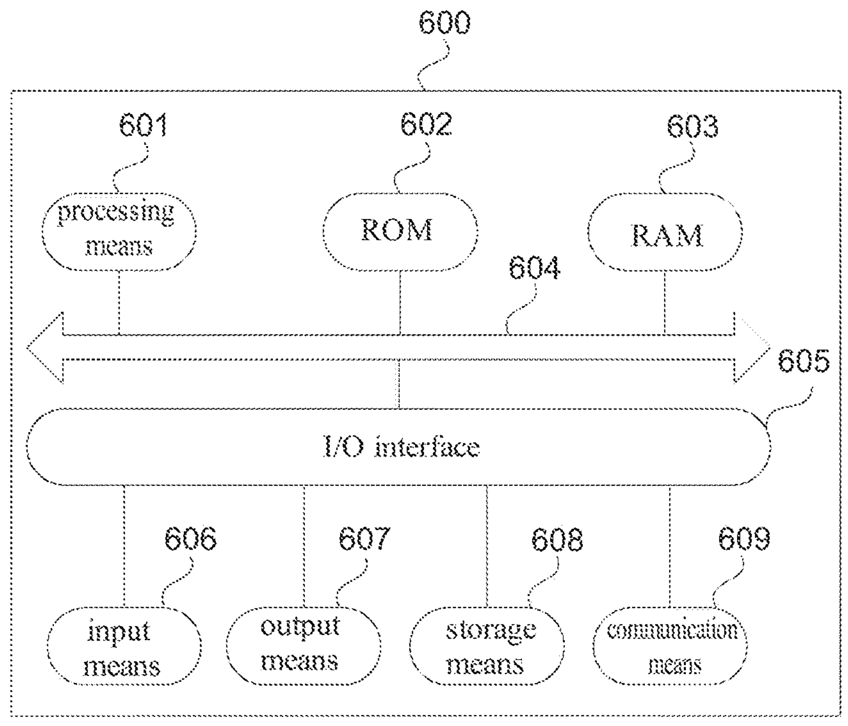
FIG. 6 is a structural schematic diagram of an electronic device provided by the embodiments of the present disclosure.

Referring now to FIG. 6, shown is a schematic block diagram of an electronic device (e.g., a terminal device or server) 600 suitable for use in implementing embodiments of the present disclosure. The terminal device in the embodiments of the present disclosure may include, but is not limited to, mobile terminals such as a mobile phone, a notebook computer, a Digital broadcast receiver, a Personal Digital Assistant (PDA), a PAD, a Portable Multimedia Player (PMP), a vehicle-mounted terminal (e.g., vehicle-mounted navigation terminal), and the like, and fixed terminals such as a Digital Television (TV), a desktop computer, and the like. The electronic device shown in FIG. 6 is only an example, and should not bring any limitation to the functions and the scope of use of the embodiments of the present disclosure.

As shown in FIG. 6, the electronic device 600 may comprise processing means (e.g., a central processing unit, a graphics processor, etc.) 601 that may perform various appropriate actions and processes according to a program stored in a Read-Only Memory (ROM) 602 or a program loaded from storage means 606 into a Random Access Memory (RAM) 603. In the RAM 603, various programs and data necessary for operations of the electronic device 600 are also stored. The processing means 601, the ROM 602, and the RAM 603 are connected to each other via a bus 604. An Input/Output (I/O) interface 605 is also connected to the bus 604.

Generally, the following means may be connected to the I/O interface 605: input means 606 including, for example, a touch screen, a touch pad, a keyboard, a mouse, a camera, a microphone, an accelerometer, a gyroscope, and the like; output means 607 including, for example, a Liquid Crystal Display (LCD), a speaker, a vibrator, and the like; storage means 606 including, for example, a magnetic tape, a hard disk, and the like; and communication means 609. The communication means 609 may allow the electronic device 600 to perform wireless or wired communication with other devices to exchange data. While FIG. 6 illustrates the electronic device 600 having various means, it is to be understood that not all illustrated means are required to be implemented or provided. More or fewer means may be alternatively implemented or provided.

In particular, the processes described above with reference to the flow diagrams may be implemented as computer software programs, according to the embodiments of the present disclosure. For example, the embodiments of the present disclosure comprise a computer program product comprising a computer program carried on a non-transitory computer readable medium, the computer program containing program code for performing the method illustrated by the flow chart. In such an embodiment, the computer program may be downloaded and installed from a network via the communication means 609, or installed from the storage means 606, or installed from the ROM 602. The computer program, when executed by the processing means 601, performs the above-described functions defined in the methods of the embodiments of the present disclosure.

It should be noted that the computer readable medium of the present disclosure may be a computer readable signal medium or a computer readable storage medium or any combination of the two. A computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a Read-Only Memory (ROM), an Erasable Programmable Read-Only Memory (EPROM) or flash Memory, an optical fiber, a portable Compact Disc Read-Only Memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. In contrast, in the present disclosure, a computer readable signal medium may include a propagated data signal with computer readable program code embodied therein, for example, in baseband or as part of a carrier wave. Such a propagated data signal may take any of a variety of forms, including, but not limited to, an electro-magnetic signal, an optical signal, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, Radio Frequency (RF), etc., or any suitable combination of the foregoing.

In some embodiments, clients and servers may communicate using any currently known or future developed network Protocol, such as the HyperText Transfer Protocol (HTTP), and may be interconnected with any form or medium of digital data communication (e.g., a communication network). Examples of communication networks include a Local Area Network ("LAN"), a Wide Area Network ("WAN"), the internet (e.g., the internet), and peer-to-peer networks (e.g., ad hoc peer-to-peer networks), as well as any currently known or future developed Network.

The computer readable medium may be embodied in the electronic device; or may be separate and not incorporated into the electronic device.

The computer readable medium carries one or more programs which, when executed by the electronic device, cause the electronic device to: receive a device discovery instruction; generate, in responding to the device discovery instruction, a device discovery request carrying device information of the device, and send the device discovery request to a server, wherein the device discovery request is used for requesting the server to determine candidate screen projecting devices in the same local area network as the device based on the device information of the device, the device information including position information and/or network information; receive local area network communication address information of each candidate screen projecting device returned by the server; and determine target screen projecting devices from among the candidate screen projecting devices according to the local area network communication address information; or receive a device discovery request sent by a terminal device, which carries device information of the terminal device, the device information including position information and/or network information; determine candidate screen projecting devices located in the same local area network as the terminal device according to the device information of the terminal device; and send local area network communication address information of the candidate screen projecting devices to the terminal device, so that the terminal device determines target screen projecting devices from among the candidate screen projecting devices according to the local area network communication address information.

Computer program code for carrying out operations of the present disclosure may be written in one or more programming languages or combinations thereof, including but not limited to an object oriented programming language such as Java, Smalltalk, C++, including conventional procedural programming languages, such as the "C" language or similar programming languages. The program code may execute entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a Local Area Network (LAN) or a Wide Area Network (WAN), or connected to an external computer (for example, through the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, program segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented by software or hardware, wherein the names of the modules do not in some cases constitute a limitation of the unit itself.

The functions described herein above may be performed, at least in part, by one or more hardware logic components. For example, without limitation, exemplary types of hardware logic components that may be used include: field Programmable Gate Arrays (FPGAS), Application Specific Integrated Circuits (ASICs), Application Specific Standard Parts (ASSPs), System On Chip (SOCs), Complex Programmable Logic Devices (CPLDs), and so forth.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer diskette, a hard disk, a Random Access Memory (RAM), a read-only memory (ROM), an erasable programmable read-only memory (EPROM) or flash memory, an optical fiber, CD-ROM, an optical storage device, a magnetic storage device, or any suitable combination of the foregoing.

Example 1, which provides, according to one or more embodiments of the present disclosure, a screen projecting device discovery method, which is applied to a terminal device, the method comprising: receiving a device discovery instruction; in response to the device discovery instruction, generating a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including position information and/or network information; receiving local area network communication address information of each candidate screen projecting device returned by the server; and determining a target screen projecting device from among all the candidate screen projecting devices according to the local area network communication address information of each candidate screen projecting device.

Example 2 the method of Example 1, according to one or more embodiments of the present disclosure, wherein the determining a target screen projecting device from among all the candidate screen projecting devices according to the local area network communication address information of each candidate screen obtaining projecting device comprises: device description information of each candidate screen projecting device from said each candidate screen projecting device according to the local area network communication address information of said each candidate screen projecting device; and determining at least one candidate screen projecting device, the device description information of which is obtained, as at least one target screen projecting device.

Example 3 the method of Example 2, according to one or more embodiments of the present disclosure, wherein the obtaining, from each candidate screen projecting device, device description information of said each candidate screen projecting device according to the local area network communication address information of said each candidate screen projecting device comprises: sending, for each candidate screen projecting device, a description information obtaining request to the candidate screen projecting device according to the local area network communication address information of the candidate screen projecting device, and receiving device description information of the candidate screen projecting device returned by the candidate screen projecting device based on the description information obtaining request.

Example 4 the method of Example 1, according to one or more embodiments of the present disclosure, further comprising: in response to the device discovery instruction, performing screen projecting device discovery based on at least one of a WiFi protocol, a Bluetooth protocol and a near-field communication protocol, and determining all the discovered screen projecting devices as target screen projecting devices.

Example 5 the method of any of Examples 1-4, according to one or more embodiments of the present disclosure, further comprising: upon receiving a screen projecting operation with respect to any target screen projecting device, establishing a screen projecting connection with any target screen projecting device corresponding to the screen projecting operation according to communication information of said any target screen projecting device corresponding to the screen projecting operation, wherein the communication information includes at least one of local area network communication address information, Bluetooth communication identification information and near-field communication identification information.

Example 6 the method of Example 5, according to one or more embodiments of the present disclosure, after the establishing screen projecting connection with said any target screen projecting device corresponding to the screen projecting operation, further comprising: if the screen projecting connection comprises screen projecting connection established based on local area network communication address information, storing local area network communication address information of said any target screen projecting device corresponding to the screen projecting operation; the method further comprising: in response to the device discovery instruction, determining screen projecting devices corresponding to all the local area network communication address information stored in the terminal device as target screen projecting devices.

Example 7 the method of Example 6, according to one or more embodiments of the present disclosure, wherein the determining, as target screen projecting devices, screen projecting devices corresponding to all the local area network communication address information stored in the terminal device comprises: obtaining device description information of a screen projecting device corresponding to each piece of local area network communication address information according to said each piece of local area network communication address information stored in the terminal device; and determining at least one screen projecting device the device description information of which is obtained, as at least one target screen projecting device.

Example 8 the method of Example 7, according to one or more embodiments of the present disclosure, further comprising: device, deleting, from the terminal local area network communication address information of the screen projecting device the device description information of which has not been obtained for a set number of times continuously.

Example 9, which provides, according to one or more embodiments of the present disclosure, a screen projecting device discovery method, which is applied to a server, the method comprising: receiving a device discovery request sent from a terminal device, which carries device information of the terminal device, the device information including position information and/or network information; determining all candidate screen projecting devices that are located in the same local area network as the terminal device according to the device information of the terminal device; and sending local area network communication address information of each candidate screen projecting device to the terminal device, so that the terminal device determines a target screen projecting device from among all the candidate screen projecting devices according to the local area network communication address information of each candidate screen projecting device.

Example 10 the method of Example 9, according to one or more embodiments of the present disclosure, wherein the device information includes position information and network information, and the determining, according to the device information of the terminal device, all candidate screen projecting devices located in the same local area network as the terminal device comprises: determining all close-range screen projecting devices located within a preset distance range from the terminal device according to the position information of the terminal device and the position information of at least one screen projecting device stored in the server; and determining all candidate screen projecting devices located in the same local area network as the terminal device from among the close-range screen projecting devices, according to the network information of the terminal device and the network information of each close-range screen projecting device stored in the server.

Example 11 the method of Example 10, according to one or more embodiments of the present disclosure, before the determining all candidate screen projecting devices located in the same local area network as the terminal device according to the device information of the terminal device, the method further comprising: determining that the network to which the terminal device is currently connected is a local area network, according to the network information of the terminal device.

Example 12 the method of Example 10, according to one or more embodiments of the present disclosure, before the receiving a device discovery request sent by the terminal device, further comprising: receiving and storing device information of at least one screen projecting device, wherein the device information of each screen projecting device is reported by the screen projecting device.

Example 13, which provides, according to one or more embodiments of the present disclosure, a screen projecting device discovery apparatus, comprising: an instruction receiving module configured to receive a device discovery instruction; a first response module configured to generate, in response to the device discovery instruction, a device discovery request carrying device information of the terminal device, and send the device discovery request to a server, wherein the device discovery request is used for requesting the server to determine, based on the device information of the terminal device, all candidate screen projecting devices that are located in the same local area network as the terminal device, the device information including position information and/or network information; an information receiving module configured to receive local area network communication address information of each candidate screen projecting device returned by the server; and a target device determining module configured to determine a target screen projecting device from among all the candidate screen projecting devices according to the local area network communication address information of each candidate screen projecting device.

Example 14, which provides, according to one or more embodiments of the present disclosure, a screen projecting device discovery apparatus, comprising: a request receiving module configured to receive a device discovery request sent by a terminal device, which carries device information of the terminal device, the device information including position information and/or network information; a candidate device determining module configured to determine all candidate screen projecting devices that are located in the same local area network as the terminal device based on the device information of the terminal device; and an information sending module configured to send local area network communication address information of each candidate screen projecting device to the terminal device, so that the terminal device determines a target screen projecting device from among all the candidate screen projecting devices according to the local area network communication address information of each candidate screen projecting device.

Example 15, which provides, according to one or more embodiments of the present disclosure, an electronic device, comprising: one or more processors; a memory configured to store one or more programs, wherein when the one or more programs are executed by the one or more processors, the one or more processors implement the screen projecting device discovery method according to any one of Examples 1-12.

Example 16, which provides, according to one or more embodiments of the present disclosure, a computer-readable storage medium on which a computer program is stored, wherein the program, when executed by a processor, implements the screen projecting device discovery method according to any one of Examples 1-12.

Further, while various operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

What is claimed is:

1. A screen projecting device discovery method, which is applied to a terminal device, the method comprising:
receiving a device discovery instruction;
generating, in response to the device discovery instruction, a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including at least one of position information and network information;
receiving local area network communication address information of each of the candidate screen projecting devices returned by the server; and
determining a target screen projecting device from among all the candidate screen projecting devices according to the local area network communication address information of each of the candidate screen projecting devices.

2. The method according to claim 1, wherein the determining the target screen projecting device from among all the candidate screen projecting devices according to the local area network communication address information of each of the candidate screen projecting devices comprises:
obtaining device description information of each of the candidate screen projecting devices from said each candidate screen projecting device according to the local area network communication address information of said each candidate screen projecting device; and
determining at least one candidate screen projecting device, the device description information of which is obtained, as at least one target screen projecting device.

3. The method according to claim 2, wherein the obtaining device description information of each of the candidate screen projecting devices from said each candidate screen projecting device according to the local area network communication address information of said each candidate screen projecting device comprises:
sending a description information obtaining request to said each candidate screen projecting device according to the local area network communication address information of said each candidate screen projecting device, and receiving device description information of said each candidate screen projecting device returned by said each candidate screen projecting device based on the description information obtaining request.

4. The method according to claim 1, further comprising:
in response to the device discovery instruction, performing screen projecting device discovery based on at least one of a Wireless Fidelity WiFi protocol, a Bluetooth protocol and a near-field communication protocol, and determining all discovered screen projecting devices as target screen projecting devices.

5. The method according to claim 1, further comprising: in the case where a screen projecting operation with respect to any target screen projecting device is received, establishing a screen projecting connection with said any target screen projecting device corresponding to the screen projecting operation according to communication information of said any target screen projecting device corresponding to the screen projecting operation, the communication information including at least one of local area network communication address information, Bluetooth communication identification information and near-field communication identification information.

6. The method according to claim 5, after the establishing a screen projecting connection with said any target screen projecting device corresponding to the screen projecting operation, further comprising:

in the case where the screen projecting connection comprises a screen projecting connection established based on local area network communication address information, storing local area network communication address information of said any target screen projecting device corresponding to the screen projecting operation;

the method further comprising:

in response to the device discovery instruction, determining screen projecting devices corresponding to all the local area network communication address information stored in the terminal device as target screen projecting devices.

7. The method according to claim 6, wherein the determining screen projecting devices corresponding to all the local area network communication address information stored in the terminal device as target screen projecting devices comprises:

obtaining device description information of a screen projecting device corresponding to each piece of local area network communication address information according to said each piece of local area network communication address information stored in the terminal device; and determining at least one screen projecting device the device description information of which is obtained, as at least one target screen projecting device.

8. The method according to claim 7, further comprising: deleting, from the terminal device, local area network communication address information of the screen projecting device the device description information of which has not been obtained for a set number of times continuously.

9. A screen projecting device discovery method, which is applied to a server, the method comprising:

receiving a device discovery request sent from a terminal device, which carries device information of the terminal device, the device information including at least one of position information and network information;

determining all candidate screen projecting devices that are located in the same local area network as the terminal device according to the device information of the terminal device; and sending local area network communication address information of each of the candidate screen projecting devices to the terminal device, so that the terminal device determines a target screen projecting device from among all the candidate screen projecting devices according to the local area network communication address information of each of the candidate screen projecting devices.

10. The method according to claim 9, wherein the device information includes the position information and the network information, and the determining all candidate screen projecting devices that are located in the same local area network as the terminal device according to the device information of the terminal device comprises:

determining all close-range screen projecting devices located within a preset distance range from the terminal device according to the position information of the terminal device and position information of at least one screen projecting device stored in the server; and determining all candidate screen projecting devices located in the same local area network as the terminal device from among the close-range screen projecting devices, according to the network information of the terminal device and network information of each close-range screen projecting device stored in the server.

11. The method according to claim 10, before the determining all candidate screen projecting devices that are located in the same local area network as the terminal device according to the device information of the terminal device, further comprising:

determining that the network to which the terminal device is currently connected is a local area network, according to the network information of the terminal device.

12. The method according to claim 10, before the receiving a device discovery request sent by the terminal device, further comprising:

receiving and storing device information of at least one screen projecting device, wherein the device information of each screen projecting device is reported by the screen projecting device.

13. A non-transitory computer-readable storage medium on which a computer program is stored, wherein the computer program, when executed by a processor, implements the screen projecting device discovery method according to claim 9.

14. A non-transitory computer-readable storage medium on which a computer program is stored, wherein the computer program, when executed by a processor, implements the screen projecting device discovery method according to claim 10.

15. A non-transitory computer-readable storage medium on which a computer program is stored, wherein the computer program, when executed by a processor, implements the screen projecting device discovery method according to claim 11.

16. A non-transitory computer-readable storage medium on which a computer program is stored, wherein the computer program, when executed by a processor, implements the screen projecting device discovery method according to claim 12.

17. An electronic device, comprising:

at least one processor;

a memory configured to store at least one program, wherein when the at least one program is executed by the at least one processor, the at least one processor implements a screen projecting device discovery method, which is applied to a terminal device, the method comprising:

receiving a device discovery instruction;

generating, in response to the device discovery instruction, a device discovery request carrying device information of the terminal device, and sending the device discovery request to a server, wherein the device discovery request is used for requesting the server to determine all candidate screen projecting devices that are located in the same local area network as the terminal device based on the device information of the terminal device, the device information including at least one of position information and network information;

receiving local area network communication address information of each of the candidate screen projecting devices returned by the server; and determining a target screen projecting device from among all the candidate screen projecting devices according to the local area network communication address information of each of the candidate screen projecting devices.

18. The electronic device according to claim 17, wherein the determining the target screen projecting device from among all the candidate screen projecting devices according to the local area network communication address information of each of the candidate screen projecting devices comprises:

obtaining device description information of each candidate screen projecting device from said each candidate screen projecting device according to the local area network communication address information of said each candidate screen projecting device; and determining at least one candidate screen projecting device, the device description information of which is obtained, as at least one target screen projecting device.

19. The electronic device according to claim 18, wherein the obtaining device description information of each candidate screen projecting device from said each candidate screen projecting device according to the local area network communication address information of said each candidate screen projecting device comprises:

sending a description information obtaining request to said each candidate screen projecting device according to the local area network communication address information of said each candidate screen projecting device, and receiving device description information of said each candidate screen projecting device returned by said each candidate screen projecting device based on the description information obtaining request.

20. The electronic device according to claim 17, wherein the method further comprises:

in response to the device discovery instruction, performing screen projecting device discovery based on at least one of a Wireless Fidelity WiFi protocol, a Bluetooth protocol and a near-field communication protocol, and determining all discovered screen projecting devices as target screen projecting devices.

* * * * *